(12) United States Patent
Nagasawa

(10) Patent No.: US 10,589,706 B2
(45) Date of Patent: Mar. 17, 2020

(54) OCCUPANT PROTECTION DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 89 days.

(21) Appl. No.: 15/850,584

(22) Filed: Dec. 21, 2017

(65) Prior Publication Data

US 2018/0272981 A1 Sep. 27, 2018

(30) Foreign Application Priority Data

Mar. 27, 2017 (JP) ................................. 2017-060292

(51) Int. Cl.
| | |
|---|---|
| *B60R 21/18* | (2006.01) |
| *B60R 21/0136* | (2006.01) |
| *B60R 21/203* | (2006.01) |
| *B60R 21/205* | (2011.01) |
| *B60R 21/013* | (2006.01) |

(Continued)

(52) U.S. Cl.
CPC ............ *B60R 21/18* (2013.01); *B60R 21/013* (2013.01); *B60R 21/0136* (2013.01); *B60R 21/203* (2013.01); *B60R 21/205* (2013.01); *B60R 21/231* (2013.01); *B60R 2021/0004* (2013.01);

(Continued)

(58) Field of Classification Search
CPC ..... B60R 21/18; B60R 21/231; B60R 21/013; B60R 21/205; B60R 21/203; B60R 21/0136; B60R 2021/23107; B60R 2021/01034; B60R 2021/0004
See application file for complete search history.

(56) References Cited

U.S. PATENT DOCUMENTS

| | | | |
|---|---|---|---|
| 3,865,398 A * | 2/1975 | Woll | B60R 21/18 280/733 |
| 5,863,065 A * | 1/1999 | Boydston | B60R 21/01 280/730.1 |

(Continued)

FOREIGN PATENT DOCUMENTS

| | | |
|---|---|---|
| JP | 2009-166774 A | 7/2009 |
| JP | 2010-235009 A | 10/2010 |
| JP | 2014-196014 A | 10/2014 |

OTHER PUBLICATIONS

Decision to Grant a Patent in Japanese Patent Application No. 2017-060292 (3 pages in Japanese with English Machine Translation).

*Primary Examiner* — Frank B Vanaman
(74) *Attorney, Agent, or Firm* — Smith, Gambrell & Russell, LLP

(57) ABSTRACT

An occupant protection device including a three-point seat belt, a waist air bag, and an anterior air bag. The three-point seat belt restrains an occupant seated in a seat of an automobile. The waist air bag is provided on the seat belt and deployable in front of a waist of the occupant. The anterior air bag is deployable on a front side of the waist air bag in such a manner that a load of a collapsing upper body of the occupant seated in the seat acts on the anterior air bag. The waist air bag is deployable so as to be stiffer than the deployed anterior air bag, in such a manner that the waist air bag is pushed towards the waist by the anterior air bag deformed by the load of the collapsing upper body acting on the anterior air bag.

20 Claims, 8 Drawing Sheets

(51) Int. Cl.
   *B60R 21/231* (2011.01)
   *B60R 21/00* (2006.01)
   *B60R 21/01* (2006.01)
(52) U.S. Cl.
   CPC ............... *B60R 2021/01034* (2013.01); *B60R 2021/23107* (2013.01)

(56) References Cited

U.S. PATENT DOCUMENTS

| | | | | |
|---|---|---|---|---|
| 7,600,780 | B2* | 10/2009 | Tobata | B60R 21/18 280/733 |
| 2005/0067820 | A1* | 3/2005 | Keeslar | B60R 21/18 280/733 |
| 2006/0192367 | A1* | 8/2006 | Zumpano | B60N 2/286 280/730.1 |
| 2009/0051150 | A1* | 2/2009 | Murakami | B60R 21/18 280/733 |
| 2013/0088056 | A1* | 4/2013 | Quatanens | B60R 21/233 297/216.13 |
| 2017/0174171 | A1* | 6/2017 | Dennis | B60R 21/0136 |
| 2017/0225788 | A1* | 8/2017 | Humbert | B60R 21/18 |

* cited by examiner

--RELATED ART--

--RELATED ART--

--RELATED ART--

--RELATED ART--

--RELATED ART--

--RELATED ART--

OCCUPANT PROTECTION DEVICE

CROSS-REFERENCE TO RELATED APPLICATIONS

The present application claims priority from Japanese Patent Application No. 2017-060292 filed on Mar. 27, 2017, the entire contents of which are hereby incorporated by reference.

BACKGROUND

1. Technical Field

The present disclosure relates to a device that protects an occupant seated in a seat of an automobile.

2. Related Art

There is a device that protects an occupant seated in a seat of an automobile by using a seat belt and a front air bag (Japanese Unexamined Patent Application Publication No. 2010-235009).

The seat belt is typically a three-point seat belt and includes a lap portion around the waist of the occupant sitting in the seat, and a shoulder portion crossed diagonally across the front portion of the upper body. Furthermore, a retractor retracts the seat belt to reduce the slackness of the seat belt before a collision and restricts the seat belt from being sent out during the collision. With the above, the seat belt can be actuated to maintain the body of the occupant, which is about to move to the front from the seat during a collision, in a seated state in the seat.

The front air bag is, in an occupant compartment, provided in a steering wheel or a dashboard provided in front of the seat, and is deployed rearwardly towards the seat. Furthermore, the deployed front air bag supports the upper body of the occupant that is collapsing forward at the time of collision and absorbs the impact.

However, the occupant is not necessarily always protected appropriately against all forms of collision even when such an occupant protection device is used.

For example, in a case of a front collision as well, there is a possibility of the occupant seated in the seat being moved forward by the impact of the collision. Furthermore, when the waist of the occupant slides and moves forward from the sitting position of the seat, the upper body about to collapse forward about the waist, serving as an axis, collapses forward while the upper body is near the front air bag. In such a case, the state in which the front air bag and the upper body come into contact with each other is different from the anticipated state in which the waist is at the sitting position of the seat.

Accordingly, one can conceive of restraining the waist of the occupant from the front so that the waist of the occupant does not slide and move forward from the sitting position of the seat.

However, for example, when the waist is restrained from the front, the abdominal region is restrained from the front. In the human body, the abdominal region does not have any bones. If, supposedly, a center portion of the abdominal region is restrained from the front, a partial and local pressure will act on the center portion of the abdominal region. Moreover, even when the center portion of the abdominal region is restrained from the front, the waist of the occupant easily slides and moves forward from the sitting position of the seat.

Furthermore, the position and the area of the waist of the occupant seated in the seat is different according to the adjusted front-rear position of the seat in the vehicle body, the body shape of the occupant seated in the seat, the sitting posture of the occupant, and the like. Accordingly, it is not easy to have the abdominal region restrained at an appropriate pressure.

As described above, a further improvement in the occupant protection performance is in need in the occupant protection device.

SUMMARY OF THE INVENTION

An aspect of the present disclosure provides an occupant protection device including a three-point seat belt, a waist air bag, an anterior air bag. The three-point seat belt is configured to restrain an occupant seated in a seat of a vehicle, a waist air bag provided on the seat belt. The waist air bag is deployable in front of a waist of the occupant. The anterior air bag is deployable on a front side of the waist air bag in such a manner that a load of a collapsing upper body of the occupant seated in the seat acts on the anterior air bag. The waist air bag is deployable so as to be stiffer than the anterior air bag that has been deployed, in such a manner that the waist air bag is pushed towards the waist by the anterior air bag deformed by the load of the collapsing upper body acting on the anterior air bag.

DETAILED DESCRIPTION

Hereinafter, examples of the present disclosure will be described with reference to the drawings.

First Example

Figure 1A:
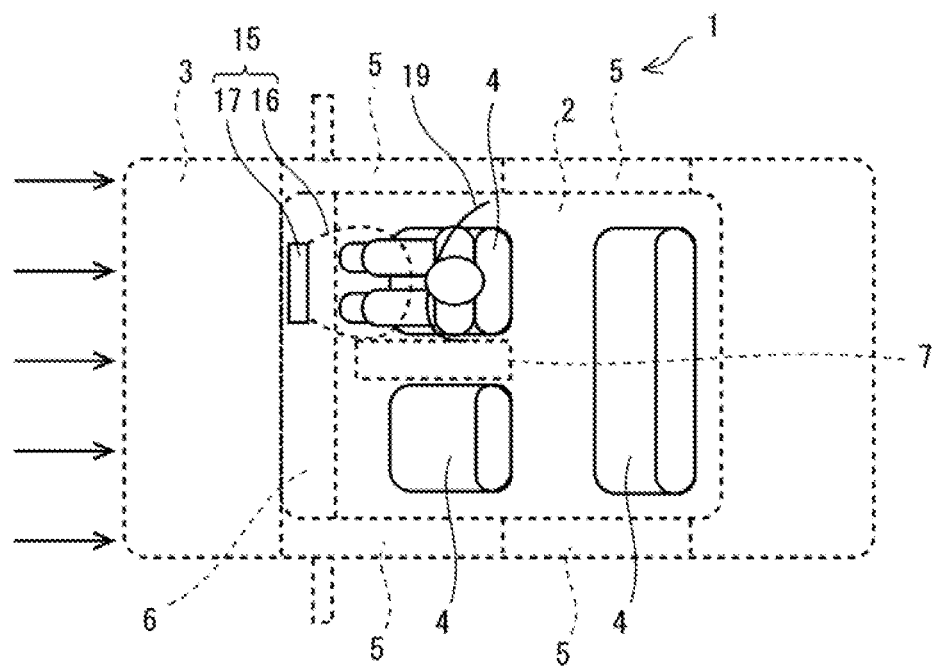
FIGS. 1A and 1B are explanatory drawings of an automobile to which an occupant protection device according to an example of the present disclosure can be applied.
Figure 1B:
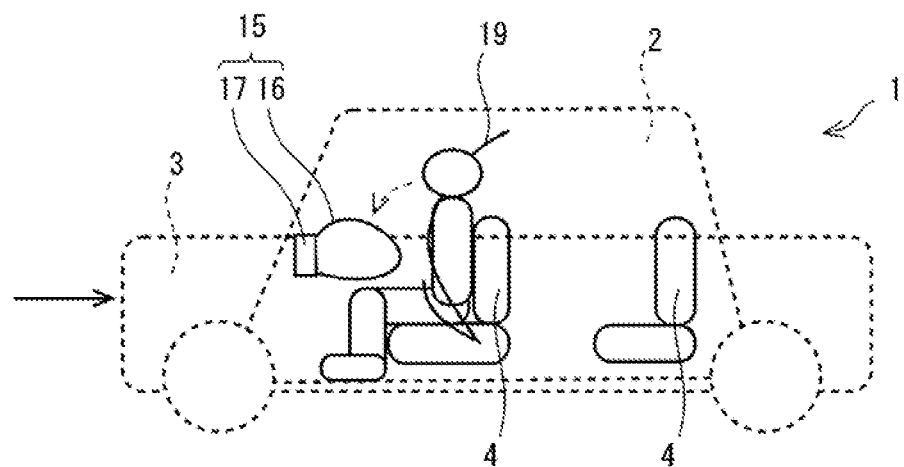

FIGS. 1A and 1B are explanatory drawings of an automobile 1 to which an occupant protection device 10 according to an example of the present disclosure can be applied.

The automobile 1 is an example of a vehicle. The automobile 1 includes a vehicle body 3 in which an occupant compartment 2 is formed. Two front seats 4 and a rear seat 4, in which occupants sit, provided facing forward in the occupant compartment 2 are provided in the occupant compartment 2. Doors 5 that are opened and closed for the occupant to get on and get off the vehicle are provided on both the left and right sides of the occupant compartment 2. A dashboard 6 having a length corresponding to the left and right width of the occupant compartment 2 is provided in front of the front seats 4. A center console 7 is provided between the two front seats 4.

Incidentally, a device that protects an occupant sitting in the seat 4 when the automobile 1 collides with another automobile is provided in the automobile 1.

A seat belt 19 and a front air bag 16 are illustrated in FIGS. 1A and 1B.

Typically, the seat belt 19 is a three-point seat belt. The three-point seat belt 19 includes a lap portion around the waist of the occupant sitting in the seat 4, and a shoulder portion crossed diagonally across the front portion of the upper body. Furthermore, a retractor (not shown) retracts the seat belt 19 to reduce the slackness of the seat belt 19 before a collision and restricts the seat belt 19 from being sent out during the collision. With the above, the seat belt 19 restrains the body of the occupant, which is about to move to the front from the seat 4 during a collision, to a seated state in the seat 4.

The front air bag 16 is, in the occupant compartment 2, provided in a steering wheel or the dashboard 6 provided in front of the seat 4, and is deployed rearwardly towards the seat 4. Furthermore, the deployed front air bag 16 is capable of supporting the upper body of the occupant that is collapsing forward at the time of collision and is capable of absorbing the impact.

However, the occupant is not necessarily always protected appropriately against all forms of collision even when such an occupant protection device is used.

Figure 2A:
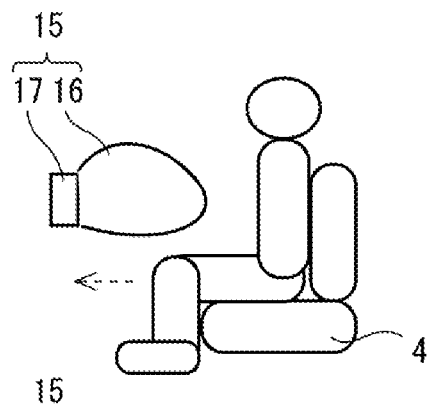
FIGS. 2A, 2B, and 2C are explanatory drawings illustrating an example of a behavior of the occupant during a full-lap and head-on collision.
Figure 2B:
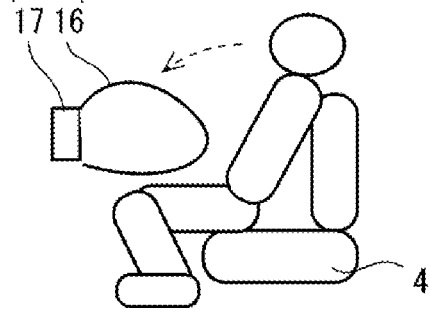
Figure 2C:
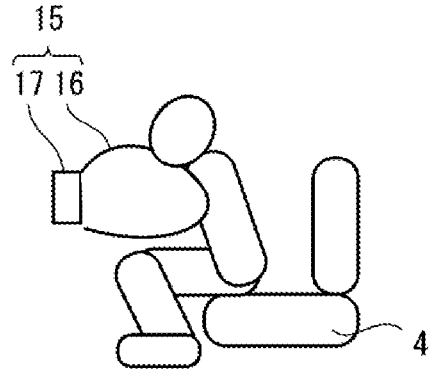

FIGS. 2A to 2C are explanatory drawings illustrating an example of a behavior of the occupant during a front collision.

When a front collision occurs while the occupant is seated in the seat 4, as illustrated in FIG. 2A, a force relatively moving the occupant forward acts on the occupant sitting in the seat 4 due to the impact of the collision.

In such a case, if the occupant is not restrained by the seat belt 19, as illustrated in FIG. 2B, the waist of the occupant slides forward and moves from the sitting position of the seat 4.

Subsequently, the waist of the occupant stops when reaching a state in which the kneecaps, for example, hit the dashboard 6, and, as illustrated in FIG. 2C, the upper body of the occupant collapses forward from the waist, serving as an axis, at the above position.

Figure 3:
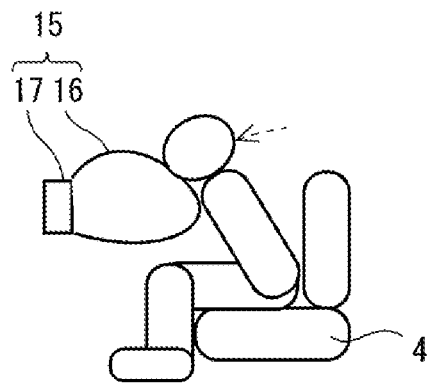
FIG. 3 is an explanatory drawing illustrating an exemplary state in which an upper body has collapsed while a waist of the occupant is, as it has been, at a sitting position of a seat.

Conversely, FIG. 3 is an explanatory drawing illustrating an exemplary state in which the upper body of the occupant has collapsed while the waist of the occupant is, as it has been, at the sitting position of the seat 4.

As it becomes apparent by making a comparison with FIG. 3, the state in which the upper body is in contact with the front air bag 16 in FIG. 2C is different from the anticipated state in FIG. 3 in which the waist is at the sitting position. The upper body of the occupant collapses forward at a position near the front air bag 16. The state in which the deployed front air bag 16 and the upper body come into contact with each other is different from the anticipated case in which the waist is at the sitting position of the seat 4. In such a case, the deployed front air bag 16 may not be able to appropriately support the collapsed upper body and absorb the impact.

Furthermore, the upper body will be collapsing forward abruptly in a short time after the movement of the waist has stopped.

Accordingly, one can conceive of restraining the waist of the occupant from the front so that the waist of the occupant does not slide and move forward from the sitting position of the seat 4.

However, for example, when the waist is restrained from the front, the abdominal region is restrained from the front. In the human body, the abdominal region does not have any bones. If, supposedly, a center portion of the abdominal region is restrained from the front, a partial and local pressure will act on the center portion of the abdominal region. Moreover, even when the center portion of the abdominal region is restrained from the front, the waist of the occupant easily slides and moves forward from the sitting position of the seat 4.

Furthermore, the position and the area of the waist of the occupant seated in the seat 4 is different according to the adjusted front-rear position of the seat 4 in the vehicle body, the body shape of the occupant seated in the seat 4, the sitting posture of the occupant, and the like. Accordingly, it is not easy to have the abdominal region restrained at an appropriate pressure.

As described above, a further improvement in the occupant protection performance of the occupant protection device is required.

Figure 4:
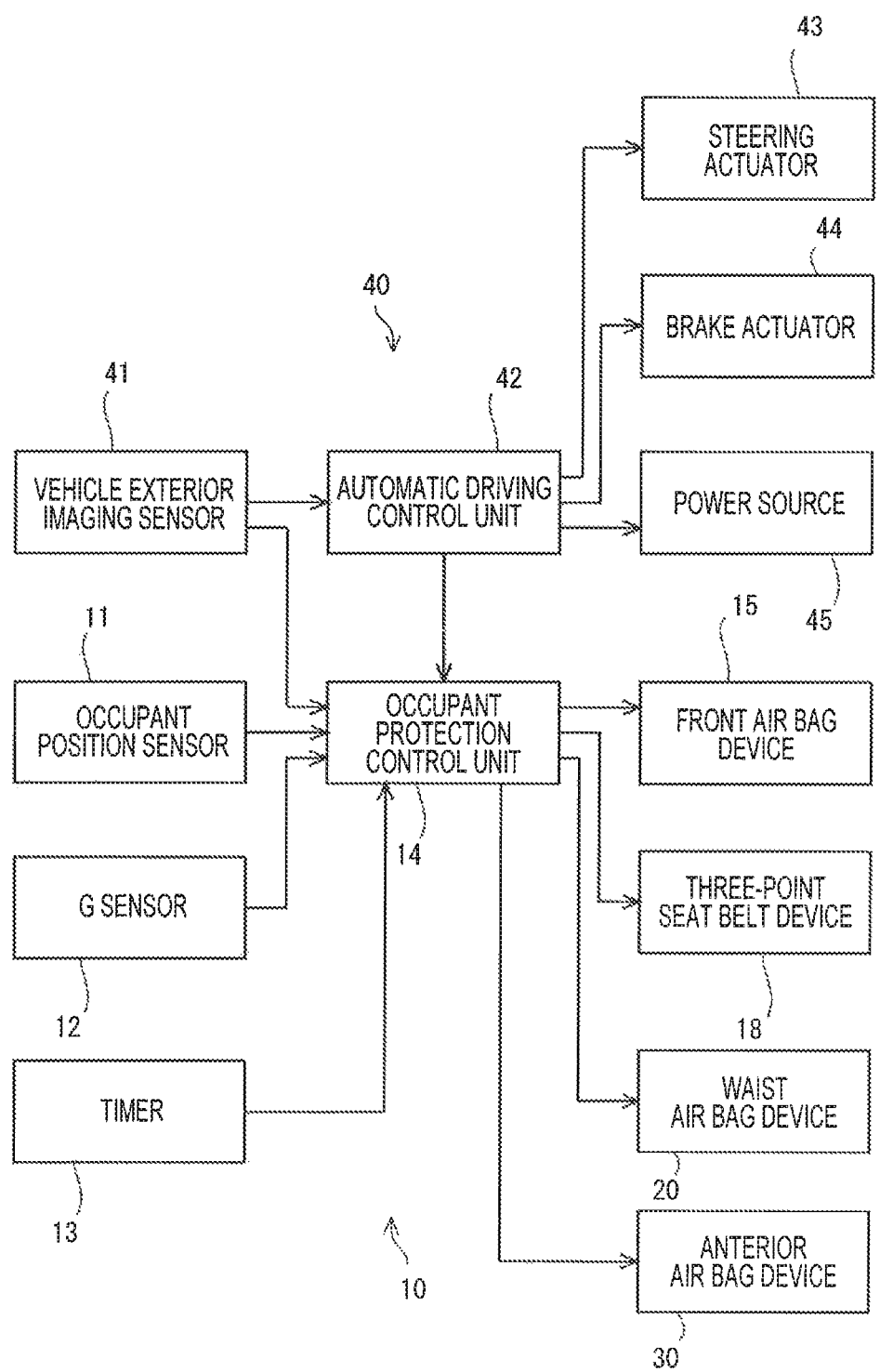
FIG. 4 is an explanatory drawing of an occupant protection device according to a first example.

FIG. 4 is an explanatory drawing of an occupant protection device 10 according to a first example.

In FIG. 4, an automatic driving control device 40 is illustrated together with the occupant protection device 10. The automatic driving control device 40 includes a vehicle exterior imaging sensor 41, an automatic driving control unit 42, a steering actuator 43, a brake actuator 44, and a power source 45.

The vehicle exterior imaging sensor 41 captures images of a portion in front of the vehicle body 3, for example. With the above, for example, other vehicle bodies that approach the moving vehicle body 3 from the front can be captured as images.

Instead of the steering wheel, the steering actuator 43 drives a steering device of the automobile 1.

Instead of the brake pedal, the break actuator 44 drives a braking device of the automobile 1.

The power source 45 is a gasoline engine or an electric motor, for example.

The automatic driving control unit 42 automatically controls the traveling of the automobile 1. The automatic driving control unit 42 controls the steering actuator 43, the break actuator 44, and the power source 45 according to information on the travel route to the destination, for example. Furthermore, the automatic driving control unit 42 identifies an approaching object on the basis of an image taken by the vehicle exterior imaging sensor 41 and estimates the collision with the approaching object. Furthermore, in a case in which a collision with an approaching object is estimated, the automatic driving control unit 42 controls the steering actuator 43, the break actuator 44, and the power source 45 so as to avoid the collision.

The occupant protection device 10 in FIG. 4 includes an occupant position sensor 11, a G sensor 12, a timer 13, an occupant protection control unit 14, a front air bag device 15, a three-point seat belt device 18, a waist air bag device 20, and an anterior air bag device 30.

The vehicle exterior imaging sensor 41, the automatic driving control unit 42, the occupant position sensor 11, the G sensor 12, the timer 13, the front air bag device 15, the three-point seat belt device 18, the waist air bag device 20, and the anterior air bag device 30 are connected to the occupant protection control unit 14.

The occupant position sensor 11 detects the position of the head or the position of the upper body of the occupant seated in the seat 4. For example, having the sitting position with the back of the body against the seat 4 as a reference, the occupant position sensor 11 detects a forward movement or a movement in the left-right direction.

The G sensor 12 detects the acceleration acting on the automobile 1. The direction of the detected acceleration may be the front-rear direction, the left-right direction, and the up-down direction.

The timer 13 measures the clock time or the time period.

The front air bag device 15 is provided in front of the occupant seated in the seat 4. The front air bag device 15 is provided in the dashboard 6 or the steering wheel, for example. The front air bag device 15 includes the front air bag 16 and an inflator 17. By input of an ignition signal, the inflator 17 discharges gas into the front air bag 16. With the above, the front air bag 16 is deployed rearwardly towards the occupant seated in the seat 4. The front air bag 16 is deployed in front of the upper body of the occupant.

The three-point seat belt device 18 includes the seat belt 19. By having a tongue (not shown) be engaged with a buckle, the seat belt 19 forms the lap portion provided around the waist of the occupant seated in the seat 4, and the shoulder portion that is crossed diagonally across the upper body, that is, from one of the shoulders to the inside of the waist. Subsequently, by input of a pretension signal and a support signal, the retractor (not shown) retracts the seat belt 19. For example, the retractor retracts the seat belt 19 to reduce the slackness of the seat belt 19 before the collision and restricts the seat belt 19 from being sent out during the collision. With the above, the seat belt 19 can restrain the body of the occupant, which is about to move to the front from the seat 4 during the collision, to the seated state in the seat 4.

Figure 5A:
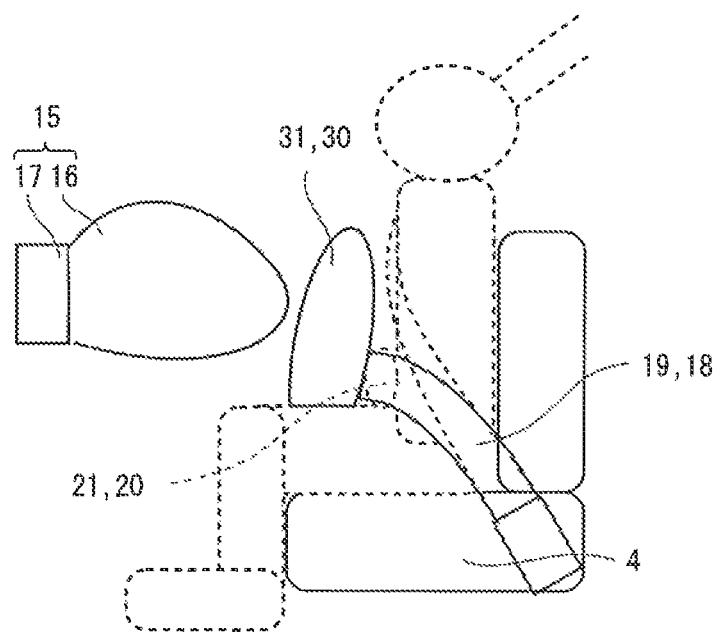
FIGS. 5A and 5B are explanatory drawings illustrating a state in which a waist air bag device and an anterior air bag device in FIG. 4 have been deployed.
Figure 5B:
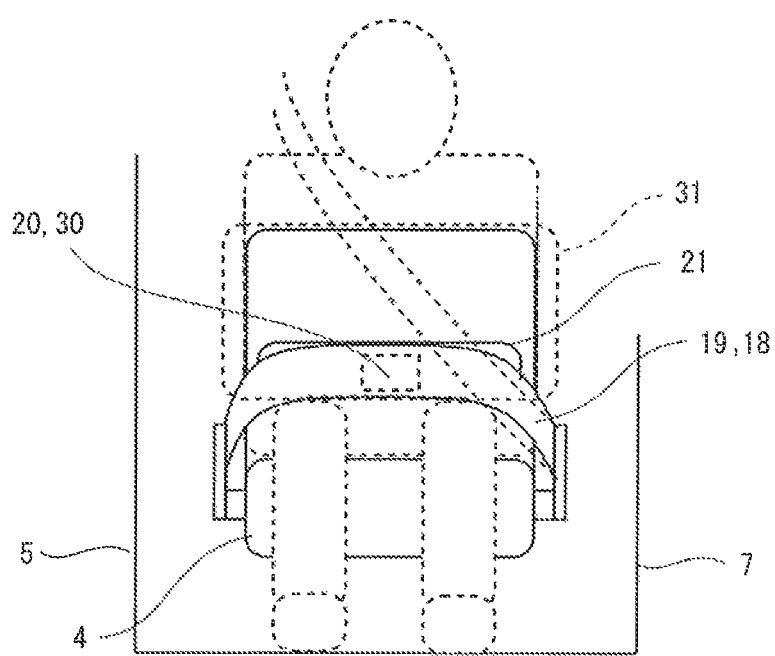

FIGS. 5A and 5B are explanatory drawings illustrating a state in which the waist air bag device 20 and the anterior air bag device 30 in FIG. 4 have been deployed. FIG. 5A is a side view and FIG. 5B is a front view.

Figure 6:
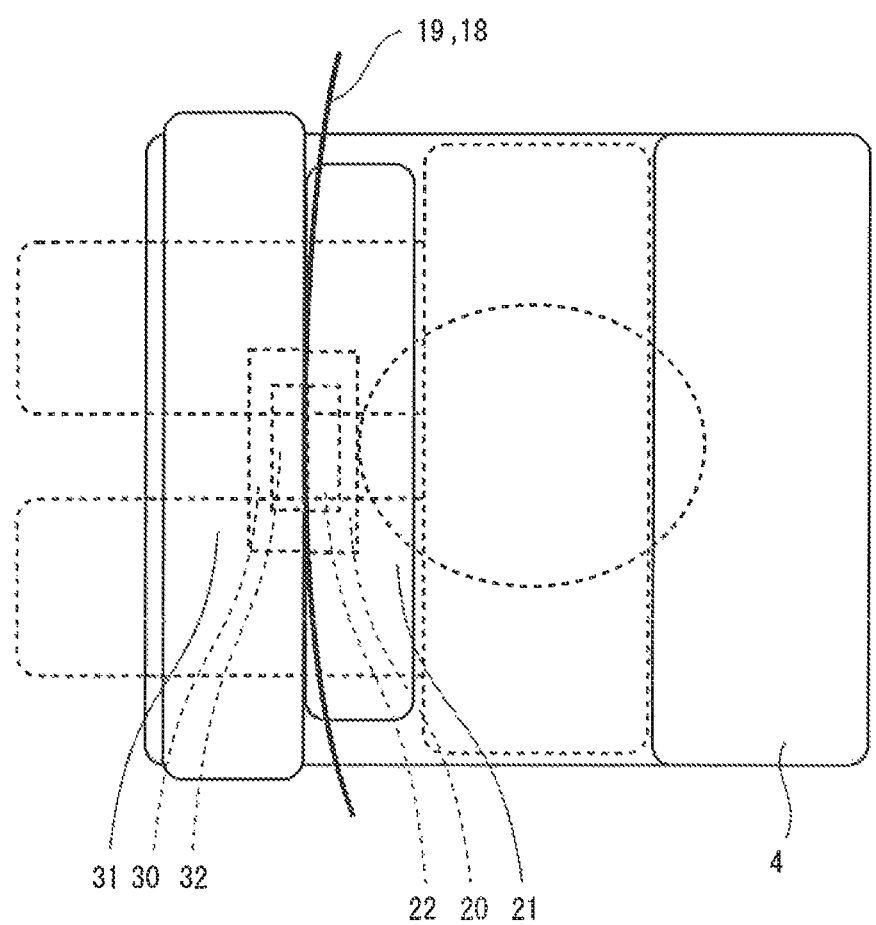
FIG. 6 is an explanatory drawing illustrating, in an enlarged manner, a state in which a waist air bag and an anterior air bag in FIGS. 5A and 5B have been deployed.

FIG. 6 is an explanatory drawing illustrating, in an enlarged manner, a state in which the waist air bag 21 and the anterior air bag 31 in FIGS. 5A and 5B have been deployed.

The waist air bag device 20 includes a waist air bag 21 and a front-of-waist inflator 22. A center portion of the waist air bag device 20 is fixed to a rear surface of the lap portion of the seat belt 19.

Upon an input of an ignition signal, the front-of-waist inflator 22 discharges gas into the waist air bag 21 and, the waist air bag 21 is deployed rearwardly and in the left-right direction at a portion on the rear side of the lap portion. The waist air bag 21 is deployed in front of the waist of the occupant seated in the seat 4 into a pillar shape long in the left-right direction. The waist air bag 21 is deployed so as to have a left-right width equivalent to a left-right width of the seat 4, in other words, a left-right width of the waist of the occupant seated in the seat 4.

The anterior air bag device 30 includes an anterior air bag 31 and an anterior inflator 32. The anterior air bag device 30 is fixed to a front surface of the lap portion of the seat belt 19.

Upon an input of an ignition signal, the anterior inflator 32 discharges gas into the anterior air bag 31 and, the anterior air bag 31 is deployed at a portion on the front side of the lap portion. The anterior air bag 31 is deployed wider in the left-right direction and higher in the up-down direction with respect to the width and height of the deployed waist air bag 21.

The anterior air bag 31 is deployed on the front side of the waist air bag 21 in the above manner.

Furthermore, the waist air bag 21 is deployed so as to be stiffer than the deployed anterior air bag 31. The air bag can be deployed in a stiff manner by increasing the amount of gas or the pressure of the gas injected into the waist air bag 21. In a case in which the sizes and the capacities of the air bags are different, the air bag that is to be stiffer can be deployed in a stiffer manner by increasing the amount of gas per unit capacity. Alternatively, by using a piece of fiber or a piece of fabric that is stronger than the fiber or the fabric used in the anterior air bag 31, the basic stiffness of the waist air bag 21 can be made stiffer.

The occupant protection control unit 14 controls the operation of the occupant protection device 10 according to the traveling state of the automobile 1. Specifically, the occupant protection control unit 14 controls the deployment of the front air bag device 15, the actuation of the three-point seat belt device 18, the deployment of the waist air bag 21, and the deployment of the anterior air bag 31.

Figure 7A:
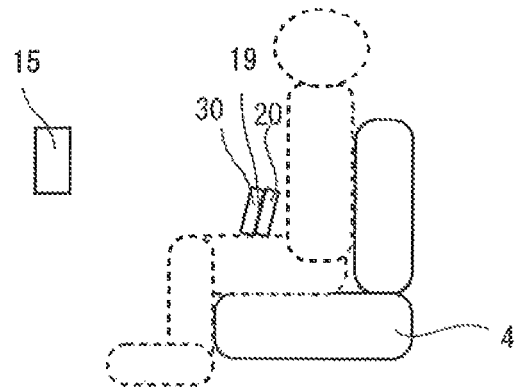
FIGS. 7A, 7B, and 7C are explanatory drawings illustrating deployment control of the waist air bag device and the anterior air bag device in FIG. 4.
Figure 7B:
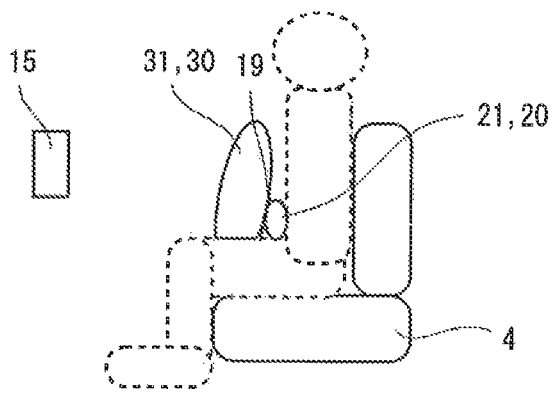
Figure 7C:
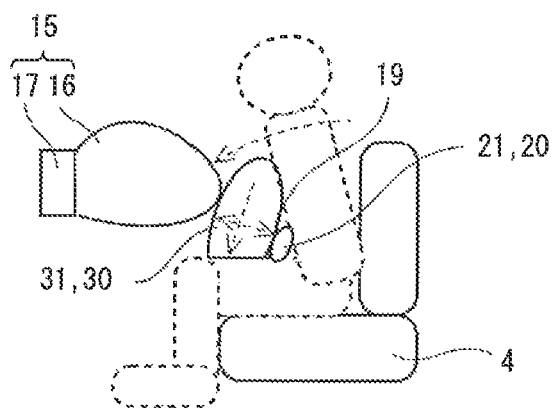

FIGS. 7A to 7C are explanatory drawings illustrating deployment control of the waist air bag device 20 and the anterior air bag device 30 in FIG. 4.

As illustrated in FIG. 7A, in a state in which the occupant is seated in the sitting position of the seat 4, the occupant protection control unit 14 estimates the probability of a collision on the basis of, for example, the image of a portion in front of the vehicle body 3 captured by the vehicle exterior imaging sensor 41, and traveling state information from the automatic driving control unit 42. The traveling state information includes the steering amount of the steering actuator 43, and the amount of acceleration and deceleration caused by the break actuator 44 and the power source 45. Based on the above information, the occupant protection control unit 14 determines the running route of the vehicle body 3. Furthermore, an object on or in the vicinity of the running route is identified based on the captured image of a portion in front of the vehicle body 3. Based on the above information, the occupant protection control unit 14 determines the probability of a head-on collision with the object. Note that the above determination may be executed by the automatic driving control unit 42 and the occupant protection control unit 14 may acquire the determination result from the automatic driving control unit 42.

Furthermore, in a case in which there is a possibility of a head-on collision, the occupant protection control unit 14 starts the occupant protection control. In the occupant protection control, the occupant protection control unit 14 outputs an ignition signal to the front-of-waist inflator 22 of the waist air bag device 20 and an ignition signal to the anterior inflator 32 of the anterior air bag device 30. With the above, as illustrated in FIG. 7B, the waist air bag 21 and the anterior air bag 31 are deployed in front of the waist of the occupant seated in the seat 4. The anterior air bag 31 is deployed on the front side of the waist air bag 21 while interposing the lap portion of the seat belt 19 in between.

Subsequently, the upper body of the occupant collapses forward due to the input of the impact of the head-on collision. As illustrated in FIG. 7C, the upper body of the occupant collapses on the anterior air bag 31. With the above, the anterior air bag 31 that has been deployed so as to be larger than the waist air bag 21 hits both thighs of the occupant seated in the seat 4 and is squashed in the up-down direction at a portion on the front side of the waist air bag 21. As a result, the anterior air bag 31 that has been squashed in the up-down direction becomes expanded in the front-rear direction, and pushes the waist air bag 21 rearward.

With the above, the waist air bag 21 that has been deployed so as to be stiffer than the anterior air bag 31 and that is less likely to become deformed is, while trying to maintain the original shape thereof, pushed towards the waist portion so as to push the waist of the occupant seated in the seat 4 from the front. The waist air bag 21 restrains the waist of the occupant from the front and across the entire left-right width of the waist of the occupant. There is a hip bone in both the left and right side of the waist.

The waist of the occupant is restrained from the front so that the waist remains at the seated position in the seat 4; accordingly, the waist is less likely to get out of position and move from the sitting position.

Note that the occupant protection control described above may start the deployment of the waist air bag 21 and the anterior air bag 31 not at the timing when the possibility of the head-on collision has been determined but at the timing at which the actual head-on collision has been detected.

As described above, in the present example, the waist air bag 21 is deployed in front of the waist of the occupant seated in the seat 4 of the automobile 1, and the anterior air bag 31 is deployed so as to come in contact with or so as to be capable of coming in contact with the front side of the waist air bag 21. With the above, in a case in which the waist of the occupant seated in the seat 4 is about to move forward for example, the waist abuts against the waist air bag 21 and is less likely to move. The waist of the occupant seated in the seat 4 is less likely to slide and move forward from the sitting position of the seat 4 regardless of the position of the adjusted seat 4 in the front-rear direction with respect to the vehicle body, the sitting position and the posture of the occupant in the seat 4 before the deployment, and the body shape of the occupant. Furthermore, even if there is a gap remaining between the lap portion of the seat belt 19 and the waist, forward sliding and movement of the waist in the gap can be suppressed. As a result, during the collision, the waist of the occupant can be held more readily at the position where the waist is in contact with the waist air bag 21.

Moreover, the upper body of the occupant seated in the seat 4 collapses into the anterior air bag 31 when the upper body is about to collapse forward during the collision. The anterior air bag 31 becomes deformed by the load of the collapsing upper body acting thereon and pushes the waist air bag 21 towards the waist.

Owing to the above action, the upper body of the occupant, especially, the waist is less likely to move forward, for example. During a front collision, for example, the upper body of the occupant collapses forward about the waist that is stable at the sitting position; accordingly, the behavior of the upper body becomes close to the desired behavior. Furthermore, the upper body collapsing forward, for example, about the waist at the sitting position is supported by the front air bag 16 and the like and the impact can be absorbed.

In the present example, the waist air bag 21 is fixed to the lap portion of the seat belt 19 at the center portion of the lap portion and is deployed between the lap portion of the seat belt 19 and the waist of the occupant. Accordingly, the waist air bag 21 is capable of eliminating the gap between the lap portion of the seat belt 19 and the waist and is capable of restraining the waist with the seat belt 19 so that the waist does not slide and move forward. As a result, during the collision, the waist of the occupant can be held more readily at the position where the waist is in contact with the waist air bag 21.

In the present example, the anterior air bag 31 is deployed so as to be larger than the waist air bag 21. Furthermore, by having the load of the collapsing upper body act on the anterior air bag 31, the anterior air bag 31 that has been deployed in a large manner is compressed in the up-down direction at a portion in front of the waist air bag 21. The anterior air bag 31 is squashed between the upper body and both thighs of the collapsing occupant at a portion in front of the waist air bag 21 and is expanded in the front-rear direction. As a result, the waist air bag 21 positioned behind the anterior air bag 31 is pushed rearward by the rearward expansion of the anterior air bag 31, abuts against the waist, and pushes the waist rearward. During a front collision, for example, the upper body of the occupant readily collapses forward in a desired state about the waist that is pushed so as to be stable at the sitting position.

In the present example, the waist air bag 21 is deployed so as to have a left-right width that is equivalent to the left-right width of the waist of the occupant seated in the seat 4 or, for example, a left-right width of the seat 4, and the anterior air bag 31 is deployed so as to have a left-right width that is larger than the left-right width of the waist air bag 21. Accordingly, the waist air bag 21 being pushed by the anterior air bag 31 is less likely to get out of position and move away in the left-right direction. Even when the direction in which the upper body collapses is inclined in the left-right direction, the load can be readily transferred to the waist air bag 21 from the anterior air bag 31 and the waist air bag 21 can be pushed towards the waist from the front.

Moreover, since the waist air bag 21 is deployed so as to have a left-right width that is equivalent to the left-right width of the waist of the occupant seated in the seat 4 or, for example, a left-right width of the seat 4, the force pushing the waist can be applied to the entire waist in a dispersed manner. Force pushing the bones on both sides of the waist can be made to act on the waist.

Conversely, if, supposedly, only the center portion of the abdominal region is restrained from the front, a partial and local pressure will act on the center portion of the abdominal region. Moreover, even when the center portion of the soft abdominal region is restrained from the front, the waist of the occupant easily slides and moves forward from the sitting position of the seat 4. Such an issue is less likely to occur in the present example.

Second Example

The occupant protection device 10 according to a second example will be described next. In the following description, points that are different from the first example will be mainly described and description that overlaps the description of the first example will be omitted.

Figure 8:
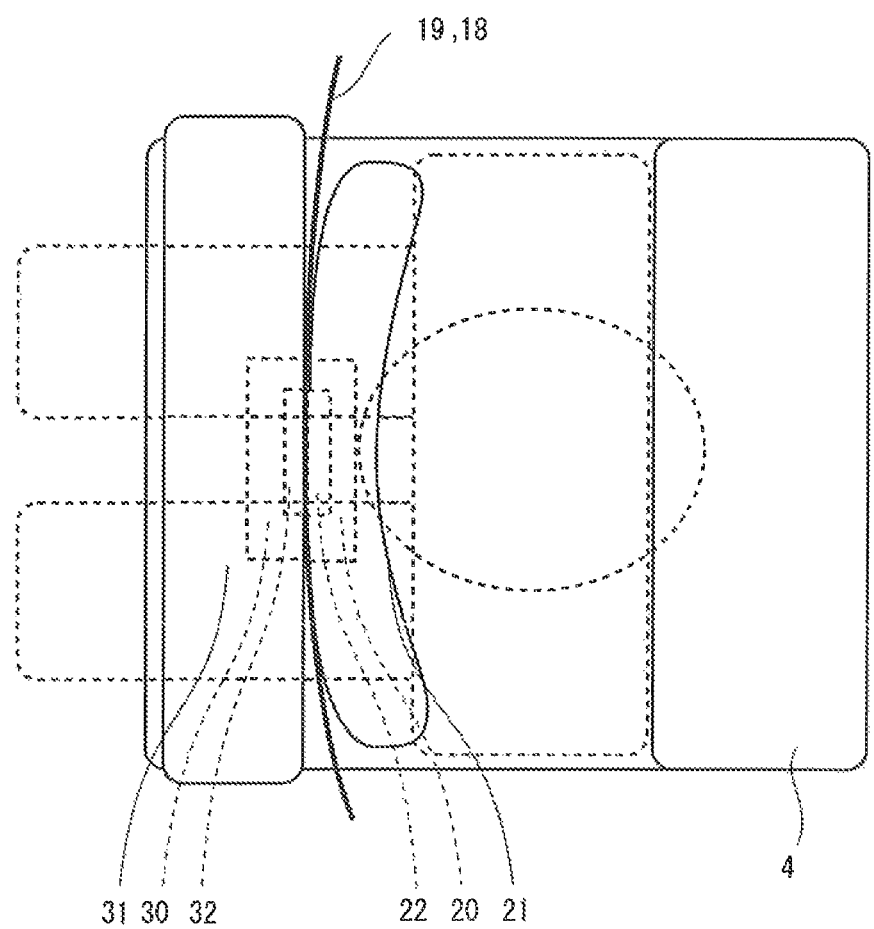
FIG. 8 is an explanatory drawing illustrating, in an enlarged manner, a state in which a waist air bag and an anterior air bag according to a second example have been deployed.

FIG. 8 is an explanatory drawing illustrating, in an enlarged manner, a state in which the waist air bag 21 and the anterior air bag 31 according to the second example have been deployed.

In FIG. 8, the waist air bag 21 is fixed to the lap portion of the seat belt 19 at the center portion of the lap portion and is deployed not in a straight columnar shape but in a curved bar shape. Furthermore, the waist air bag 21 is deployed in a curved manner so that both the left and right side portions thereof abut against the waist of the occupant, which is seated in the seat 4, in a more profound manner with respect to the center portion.

With the above, the waist air bag 21 is fixed to the lap portion of the seat belt 19 at the center portion of the lap portion and is deployed so that both end portions thereof in the left-right direction are curved so as to protrude rearward. Furthermore, the waist air bag 21, at both end portions thereof in the left-right direction, restrains both sides of the waist in the left-right direction. The force that pushes the waist preferentially acts on both sides of the waist in the left-right direction with respect to the center portion. Both sides of the waist in the left-right direction can be restrained while suppressing the pressure to the center portion.

Third Example

The occupant protection device 10 according to a third example will be described next. In the following description, points that are different from the first example will be mainly described and description that overlaps the description of the first example will be omitted.

Figure 9:
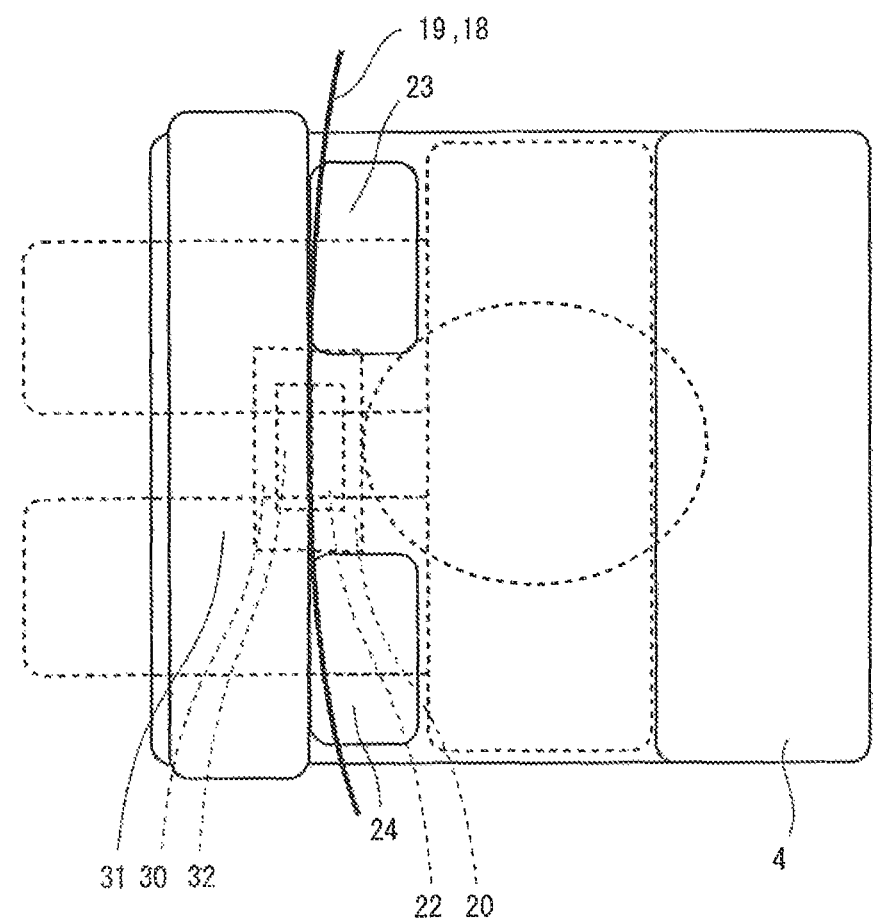
FIG. 9 is an explanatory drawing illustrating, in an enlarged manner, a state in which a right waist air bag, a left waist air bag, and an anterior air bag according to a third example have been deployed.

FIG. 9 is an explanatory drawing illustrating, in an enlarged manner, a state in which a right waist air bag 23, a left waist air bag 24, and the anterior air bag 31 according to the third example have been deployed.

In FIG. 9, the right waist air bag 23 and the left waist air bag 24 are each deployed in a columnar shape extending straight in the left-right direction from the waist air bag device 20 fixed to the lap portion of the seat belt 19 at the center portion of the lap portion.

Furthermore, the right waist air bag 23 and the left waist air bag 24 are deployed so as to abut only against the left and right sides of the waist of the occupant, which is seated in the seat 4, in a more profound manner.

The right waist air bag 23 and the left waist air bag 24 are divided in the left-right direction, are fixed to the lap portion of the seat belt 19, and are deployed between the lap portion of the seat belt 19 and both end portions of the waist of the occupant.

With the above, the right waist air bag 23 and the left waist air bag 24 are each deployed in a columnar shape extending straight in the left-right direction from the waist air bag device 20 fixed to the lap portion of the seat belt 19 at the center portion of the lap portion.

Furthermore, the right waist air bag 23 and the left waist air bag 24 restrain the side portions of the waist in the left-right direction. The force that pushes the waist preferentially acts on both sides of the waist in the left-right direction with respect to the center portion. Both sides of the waist in the left-right direction can be restrained while suppressing the pressure to the center portion.

The examples above are preferable examples of the present disclosure; however, the present disclosure is not limited by the examples and may be modified and changed in various ways within the scope of the disclosure.

In the examples described above, the waist air bag 21 and the anterior air bag 31 are formed as separate members.

Other than the above, for example, the waist air bag 21 and the anterior air bag 31 may be formed as a single integrated member. In such a case as well, by having the waist air bag 21 become deployed so that the waist air bag 21 is stiffer than the anterior air bag 31, the anterior air bag 31 can be preferentially deformed and the anterior air bag 31 can be made to function to push the waist air bag 21 rearward.

The invention claimed is:

1. An occupant protection device comprising:
   a three-point seat belt configured to restrain an occupant seated in a seat of a vehicle;
   a waist air bag provided on the seat belt, the waist air bag being deployable in front of a waist of the occupant; and
   an anterior air bag deployable on a front side of the waist air bag in such a manner that a load of a collapsing upper body of the occupant seated in the seat acts on the anterior air bag as to deform the anterior air bag,
   wherein the waist air bag is deployable so as to be stiffer than the anterior air bag that has been deployed, and such that the waist air bag is pushed by the deforming anterior air bag in a direction that directs the waist air bag toward the waist of the occupant seated in the seat.

2. The occupant protection device according to claim 1, wherein the waist air bag is fixed to a lap portion of the seat belt at a center portion of the lap portion and deployable between the lap portion of the seat belt and the waist of the occupant.

3. The occupant protection device according to claim 2, wherein the anterior air bag is deployable so as to be larger than the waist air bag that has been deployed, the anterior air bag being deployable to push the waist air bag rearward by becoming compressed in an up-down direction at a portion in front of the waist air bag with the load of the collapsing upper body acting on the anterior air bag.

4. The occupant protection device according to claim 2, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

5. The occupant protection device according to claim 3, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

6. The occupant protection device according to claim 1, wherein the waist air bag is fixed to a lap portion of the seat belt at a center portion of the lap portion and deployable in such a manner that both end portions thereof in a left-right direction are curved so as to protrude rearward.

7. The occupant protection device according to claim 6, wherein the anterior air bag is deployable so as to be larger than the waist air bag that has been deployed, the anterior air bag being deployable to push the waist air bag rearward by becoming compressed in an up-down direction at a portion in front of the waist air bag with the load of the collapsing upper body acting on the anterior air bag.

8. The occupant protection device according to claim 6, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

9. The occupant protection device according to claim 7, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

10. The occupant protection device according to claim 1, wherein the waist air bag is divided in a left-right direction and is fixed to a lap portion of the seat belt, the waist air bag being deployable between the lap portion of the seat belt and both end portions of the waist of the occupant.

11. The occupant protection device according to claim 10, wherein the anterior air bag is deployable so as to be larger than the waist air bag that has been deployed, the anterior air bag being deployable to push the waist air bag rearward by becoming compressed in an up-down direction at a portion in front of the waist air bag with the load of the collapsing upper body acting on the anterior air bag.

12. The occupant protection device according to claim 10, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

13. The occupant protection device according to claim 11, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

14. The occupant protection device according to claim 1, wherein the anterior air bag is deployable so as to be larger than the waist air bag that has been deployed, the anterior air bag being deployable to push the waist air bag rearward by becoming compressed in an up-down direction at a portion in front of the waist air bag with the load of the collapsing upper body acting on the anterior air bag.

15. The occupant protection device according to claim 14, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

16. The occupant protection device according to claim 1, wherein the waist air bag is deployable so as to have a left-right width that extends out relative to respective side edges of the seat such that, when deployed, the waist air bag is configured to present an abutment surface to a full left-right width of the waist of the occupant seated in the seat, and wherein the anterior air bag is deployable so as to have a left-right width that is larger than a left-right width of the waist air bag.

17. The occupant protection device according to claim 16, wherein the waist air bag is deployable so as to have a left-right width equivalent to the left-right width of the seat.

18. The occupant protection device according to claim 1, wherein the waist air bag is deployable so as to have a left-right width equivalent to the left-right width of the seat.

19. The occupant protection device according to claim 1, wherein the waist air bag is deployable so as to have a curvature with a concavity of the waist air bag facing the occupant of the seat.

20. An occupant protection system, comprising:

the occupation protection device according to claim 1; and a front air bag that, upon deployment, is configured to extend rearward into contact with the deforming anterior air bag.

* * * * *